United States Patent
Kimura

(10) Patent No.: US 9,451,175 B2
(45) Date of Patent: Sep. 20, 2016

(54) IMAGING APPARATUS, INFORMATION PROCESSING DEVICE, IMAGE PICKUP METHOD, AND NON-TRANSITORY COMPUTER-READABLE STORAGE MEDIUM STORING A PROGRAM THEREFOR FOR OBTAINING LIGHT FIELD INFORMATION

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 14/173,007

(22) Filed: Feb. 5, 2014

(65) Prior Publication Data

US 2014/0218591 A1    Aug. 7, 2014

(30) Foreign Application Priority Data

Feb. 7, 2013 (JP) ................................. 2013-022436

(51) Int. Cl.
| | |
|---|---|
| G02B 13/16 | (2006.01) |
| H04N 5/235 | (2006.01) |
| H04N 13/02 | (2006.01) |
| H04N 5/225 | (2006.01) |

(52) U.S. Cl.
CPC ........ *H04N 5/2356* (2013.01); *H04N 13/0228* (2013.01); *H04N 13/0282* (2013.01); *G06T 2207/10052* (2013.01)

(58) Field of Classification Search
CPC ............... G02B 7/04; H04N 5/23293; H04N 13/0282; H04N 13/0228; H04N 13/0271; G06T 2207/10052

USPC ...................................... 348/340, 345, 333.11
See application file for complete search history.

(56) References Cited

U.S. PATENT DOCUMENTS

| | | | | |
|---|---|---|---|---|
| 8,749,620 | B1* | 6/2014 | Knight et al. | 348/49 |
| 8,749,657 | B2* | 6/2014 | Iwane | G06T 1/00 348/222.1 |
| 2007/0252074 | A1* | 11/2007 | Ng et al. | 250/208.1 |
| 2010/0066812 | A1* | 3/2010 | Kajihara et al. | 348/46 |
| 2013/0076966 | A1* | 3/2013 | Border | H04N 5/23245 348/345 |
| 2013/0194387 | A1* | 8/2013 | Hatakeyama | H04N 5/3572 348/46 |

FOREIGN PATENT DOCUMENTS

| | | |
|---|---|---|
| JP | 2008-167395 A | 7/2008 |
| JP | 2008-312080 A | 12/2008 |

* cited by examiner

*Primary Examiner* — Ngoc-Yen Vu
(74) *Attorney, Agent, or Firm* — Carter, DeLuca, Farrell & Schmidt, LLP

(57) ABSTRACT

An imaging apparatus comprises: an image pickup element including a two-dimensional array of a plurality of photoelectric conversion elements, for outputting an electric signal of an optical image; a focus adjustment unit for adjusting a focus state of a photographing optical system; an image pickup control unit for obtaining electric signals from the image pickup element in a plurality of different focus states while changing the focus state by the focus adjustment unit; and a light ray determination unit for obtaining incident position information and incident angle information, which are light field information of the optical image of an object, by using the electric signals obtained in the a plurality of different focus states by the image pickup control unit.

12 Claims, 3 Drawing Sheets

IMAGING APPARATUS, INFORMATION PROCESSING DEVICE, IMAGE PICKUP METHOD, AND NON-TRANSITORY COMPUTER-READABLE STORAGE MEDIUM STORING A PROGRAM THEREFOR FOR OBTAINING LIGHT FIELD INFORMATION

BACKGROUND OF THE INVENTION

1. Field of the Invention

The present invention relates to an imaging apparatus for obtaining an image by photoelectric conversion, in particular, an imaging apparatus serving as a camera capable of obtaining so-called light field information (also called "light field camera"; hereinafter referred to as "LFC").

2. Description of the Related Art

In recent years, there has been an increase in research into an LFC in order to realize a new image pickup function. The LFC has a problem in that resolving power of positional information (resolution in the case of image) deteriorates because angular information is obtained simultaneously with the positional information of rays of light.

In order to solve the above-mentioned problem, for example, Japanese Patent Application Laid-Open No. 2008-167395 discloses a technology for combining an image pickup function of performing as the LFC and a normal image pickup function by using optical elements capable of controlling power according to an applied voltage. Japanese Patent Application Laid-Open No. 2008-312080 discloses a technology for combining the image pickup function of performing as the LFC and the normal image pickup function by arranging a microlens array movably backward and forward within a photographing optical path.

However, in the related-art technologies disclosed in the above-mentioned patent documents, it is necessary to provide expensive optical elements and to provide a complicate backward and forward driving mechanism, and hence an apparatus becomes more expensive and larger in size.

Therefore, an aspect of the present invention is to provide an imaging apparatus capable of combining an image pickup function of performing as an LFC and normal image pickup function with a simple configuration.

SUMMARY OF THE INVENTION

In order to achieve the above-mentioned object, according to one aspect of the invention, an imaging apparatus comprises: a photographing optical system for forming an optical image of an object; an image pickup element including a two-dimensional array of a plurality of photoelectric conversion elements, configured to output an electric signal of the optical image; a focus adjustment unit configured to adjust a focus state of the photographing optical system; an image pickup control unit configured to obtain an electric signal from the image pickup element in a plurality of different focus states while changing the focus state by the focus adjustment unit; and a light ray determination unit configured to obtain incident position information and incident angle information, which are light field information of the optical image of the object, by using the electric signals obtained in the plurality of different focus states by the image pickup control unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

Now, an imaging apparatus according to a first embodiment of the present invention is described with reference to FIG. 1 to FIG. 3B.

Figure 1:
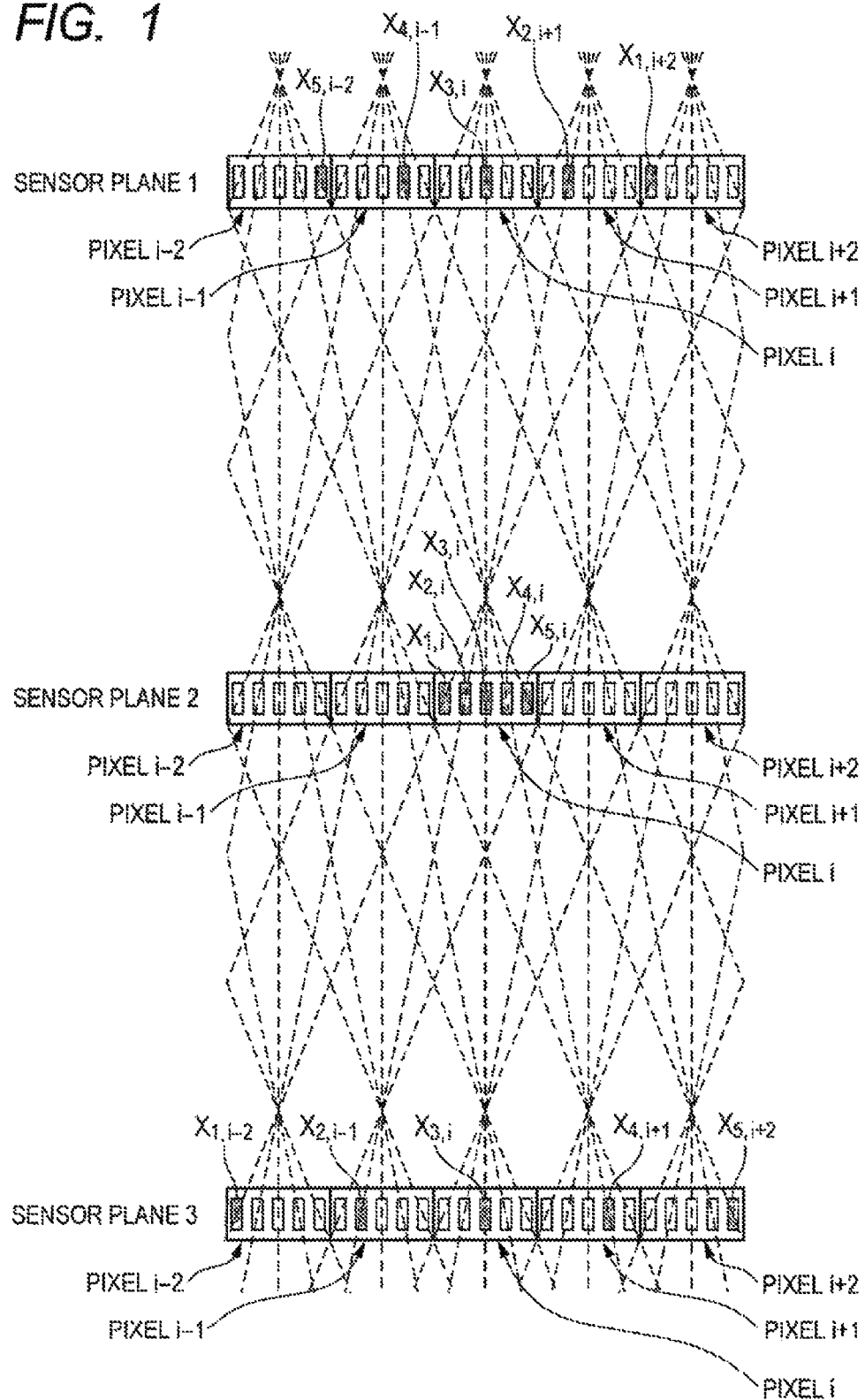
FIG. 1 is a diagram schematically illustrating rays of light picked up by an imaging apparatus according to an embodiment of the present invention.
Figure 2A:
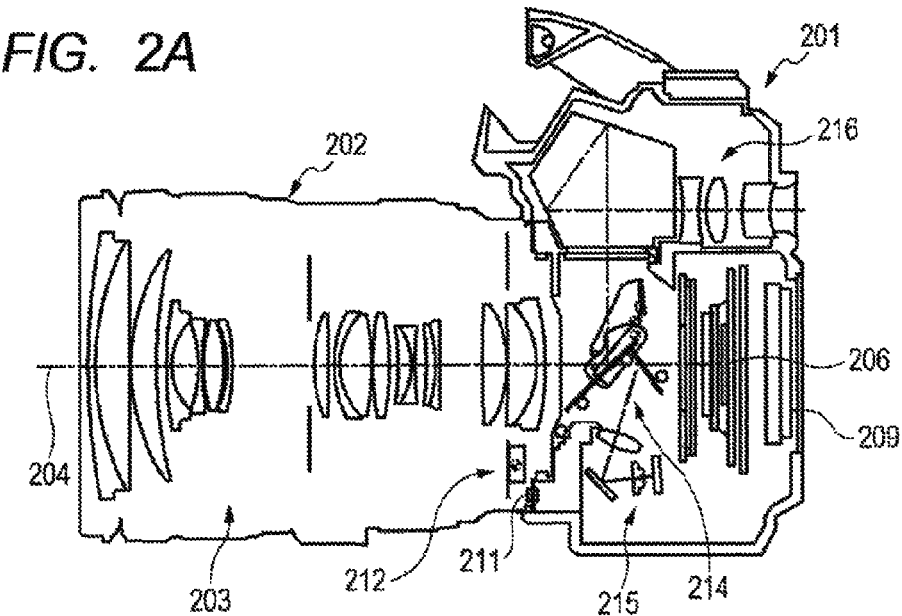
FIGS. 2A and 2B are a central sectional view and a block diagram of the imaging apparatus according to the embodiment of the present invention.
Figure 2B:
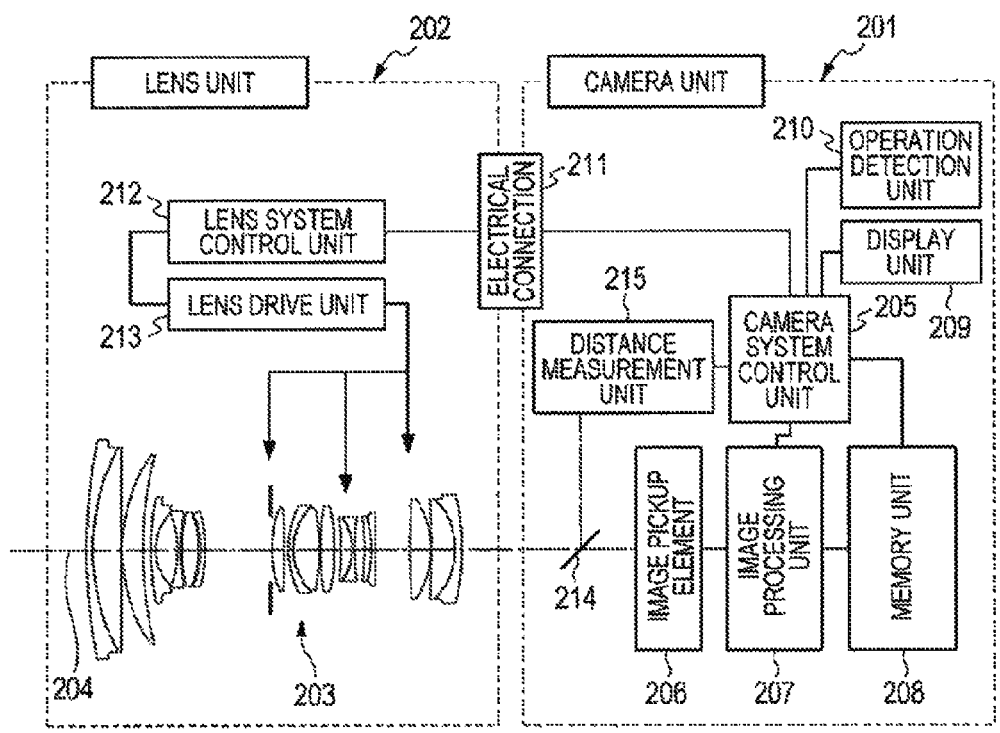

FIG. 1 is a diagram schematically illustrating rays of light picked up by the imaging apparatus according to the embodiment of the present invention. FIG. 2A is a central sectional view of a digital camera serving as the imaging apparatus according to this embodiment and lenses thereof, and FIG. 2B is a block diagram illustrating an electric configuration of the imaging apparatus. Same components between FIG. 2A and FIG. 2B are denoted by same reference numerals.

FIG. 2A illustrates an imaging apparatus (camera unit) 201, a lens unit 202 mounted to the imaging apparatus 201, a photographing optical system 203 including lenses, an optical axis 204 of the photographing optical system 203, an image pickup element 206 having a two-dimensional array of photoelectric conversion elements, and a display unit 209 serving as a rear display apparatus. Further, FIG. 2A illustrates an electrical connection 211 between the camera unit 201 and the lens unit 202, a lens system control unit 212 provided to the lens unit 202, a quick return mechanism 214, a distance measurement unit 215, and a finder display unit 216.

A camera system formed of the camera unit 201 and the lens unit 202 illustrated in FIG. 2B includes an image pickup system, an image processing system, a recording/reproduction system, and a control system. The image pickup system includes the photographing optical system 203, the image pickup element 206, and the quick return mechanism 214 (the quick return mechanism 214 includes a semitransparent mirror for dividing an optical path). The image processing system includes the image processing unit 207. Further, the recording/reproduction system includes the memory unit 208 and the display unit 209. The control system includes a camera system control unit 205, an operation detection unit 210, the lens system control unit 212, the lens drive unit 213, and the distance measurement unit 215. The lens drive unit 213 is arranged to drive a focus lens, a vibration correction lens, an iris, and the like.

The image pickup system is an optical processing system for focusing light from an object onto an image pickup plane of the image pickup element 206 via the photographing optical system 203. Further, the image pickup system includes a focus adjustment unit which adjusts a suitable focus position (so-called AF operation) by changing a state of the photographing optical system 203 by the lens drive unit 213 based on a signal from the distance measurement unit 215. Further, the image pickup system sets an exposure state (so-called AE operation) based on a signal from the image pickup element 206 or a photometry sensor (not shown). In this specification, the exposure state represents an exposure time on the image pickup element 206, an iris value of the photographing optical system 203, an amplification factor of an electric signal from the image pickup element 206, and the like.

The image processing unit 207 includes therein an A/D converter, a white balance circuit, a gamma correction circuit, and an interpolation operation circuit, and is arranged to generate an image to be recorded. Further, the image processing unit 207 may include a light ray determination unit as one of main components of the invention. Note that, this embodiment is described by assuming a case where those components are placed in the image processing unit 207.

The memory unit 208 includes a processing circuit necessary for recording in addition to an actual storage unit. The memory unit 208 supplies an output thereof to a recording unit, and generates and saves an image to be output to the rear display unit 209. Further, the memory unit 208 compresses an image, a moving image, audio sound, and the like by using a predetermined method. Further, in FIG. 2B, the memory unit 208 is shown conceptually and appears to correspond to a storage medium inserted from outside. However, the memory unit 208 includes a volatile/nonvolatile memory provided for allowing the imaging apparatus 201 to store a control program, data, and the like.

The camera system control unit 205 generates and outputs a timing signal or the like to be used at a time of image pickup, and executes the control program in response to the fact that the operation detection unit 210 detects an external operation such as a photographing mode instruction, to thereby control each of the image pickup system, the image processing system, and the recording/reproduction system. For example, the operation detection unit 210 detects that a shutter release button (not shown) is pressed, to thereby control driving of the image pickup element 206, an operation of the image processing unit 207, a compression process of data stored in the memory unit 208, and the like. In addition, the rear display unit 209 is used to control the state of each segment of an information display apparatus for performing information display on a liquid crystal monitor or the like.

An adjustment operation of the optical system performed by the control system is described. The image processing unit 207 and the distance measurement unit 215 are connected to the camera system control unit 205, and the camera system control unit 205 obtains a suitable focus position and a suitable iris position based on the signals from the image pickup element 206 and the distance measurement unit 215 and other such information. The camera system control unit 205 issues a command to the lens system control unit 212 via the electrical connection 211, and the lens system control unit 212 suitably controls the lens drive unit 213. In addition, a vibration detection sensor (not shown) is connected to the lens system control unit 212, and the lens system control unit 212 suitably controls the vibration correction lens via the lens drive unit 213 based on a signal from the vibration detection sensor in a mode for performing vibration correction.

This embodiment provides a configuration that allows an object to be observed through the optical finder of the finder display unit 216 or allows an object to be observed through the electronic view finder of the finder display unit 216 while picking up an electronic image corresponding to the optical image of the object by the image pickup element 206 (so-called live view photographing).

In this embodiment, it is possible to perform the photographing in a focus state which the imaging apparatus 201 instructs as in the AF operation described above. In other words, it is possible to perform the photographing with a main object being focused on, while it is possible to perform the photographing with a desired object being defocused (with an intended defocus state).

Figure 3A:
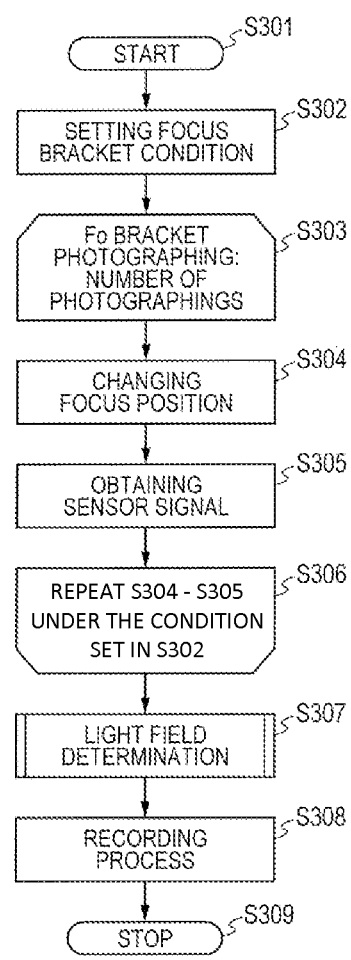
FIGS. 3A and 3B are flowcharts of operations in photographing for obtaining light field information according to the embodiment of the invention.
Figure 3B:
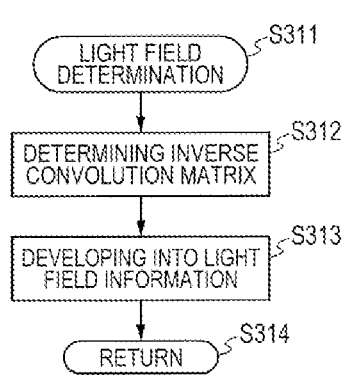

FIGS. 3A and 3B are flowcharts of operations from the photographing to the recording according to this embodiment. FIG. 3A is the flowchart of the entire operation in photographing for obtaining light field information, and FIG. 3B is the flowchart of the operation of the light ray determination unit. The operation in the photographing for obtaining the light field information according to this embodiment is described below with reference to the flowcharts of FIGS. 3A and 3B. In this specification, the wording "photographing for obtaining the light field information" is used to distinguish from normal photographing (photographing for obtaining the same information as obtained by a related-art camera). When the photographing for obtaining the so-called light field information is selected by the user through the user's instruction, the imaging apparatus performs the photographing in a mode corresponding thereto. The same photographing operation as performed by the related-art camera, which does not obtain the light field information, has been described with reference to FIGS. 2A and 2B, and hence the operation for the photographing for obtaining the light field information is mainly described with reference to FIGS. 3A and 3B.

In Step S301, according to the user's instruction, the camera system control unit 205 starts the operation for the photographing for obtaining the light field information.

Step S302 is a process in which the camera system control unit 205 determines a photographing condition. As described later, in the imaging apparatus according to this embodiment, the photographing is performed while changing the focus position (such photographing is referred to as "focus bracket photographing" hereinafter and "Fo bracket photographing" in FIGS. 3A and 3B), and the light field information is obtained based on data thereon. At this time, a desired condition for a focus bracket is set in Step S302. A desired photographing interval for the focus bracket (change width of the focus state) and a desired number of photographings for the focus bracket are determined based on a number of angular divisions (angular resolving power) of a light field and the like, which is described in detail in the explanation of the light ray determination unit.

Step S303 to Step S306 form a loop, in which image pickup control for performing the focus bracket photographing is performed under control of the camera system control unit 205 based on the determination in Step S302. Specifically, the focus position is changed in Step S304 and the sensor signal is obtained (=image is picked up) in Step S305. Those steps are repeated under the conditions set in Step S302.

In Step S307, the camera system control unit 205 calls the light ray determination unit to convert a plurality of images obtained in the processing operation up to Step S306 into the light field information.

In Step S308, the obtained light field information is recorded.

In Step S309, the operation for the photographing for obtaining the light field information is brought to an end.

The operation of the light ray determination unit is described with reference to FIG. 3B.

In Step S311, the operation of the light ray determination unit is started.

In Step S312, a matrix for an inverse convolution operation is determined. As described later with reference to FIG. 1, in the focus bracket photographing, the light field information is obtained while being convoluted as to angular information. From another point of view, the light field information may be convoluted as to a pupil passing area. In this embodiment, the light field information is described as the angular information because the description is facilitated by using an expression in the form of an incident position (pixel) and an angle of incidence (corresponding to a cell which is the photoelectric conversion elements that form the pixel). The matrix for inverse convolution is determined based on the number of angular divisions (resolving power) to be obtained, a focus bracket condition, and the like, while an obtaining method therefor is described later.

In Step S313, the matrix determined in Step S312 and the obtained image are operated, to thereby develop the resultant into the light field information. By performing this process, a plurality of images obtained by the normal photographing are converted into the light field information.

In Step S314, the procedure returns to Step S307 in which the light ray determination unit is called.

The light field information obtained in this embodiment is described with reference to FIG. 1.

In FIG. 1, a vertical direction of the drawing represents an optical axis direction, and a sensor plane 1, a sensor plane 2, and a sensor plane 3 indicate planes whose focus states are different from one another, while a horizontal direction thereof represents a spatial spread corresponding to positions of pixels existing on a sensor. Note that, for the sake of simplicity, it is assumed in FIG. 1 that pixels i−2, i−1, i, i+1, and i+2 are one-dimensionally arrayed in a horizontal direction in the this order. It is easy to expand the array two-dimensionally.

In FIG. 1, one pixel is illustrated so as to be formed of five cells. In other words, $X_{1,i}$, $X_{2,i}$, $X_{3,i}$, $X_{4,i}$, and $X_{5,i}$ are cells that form the pixel. Within a subscript thereof, the former numeral corresponds to the angle of incidence, and the latter numeral corresponds to the incident position (in this case, "i" indicating a pixel number). Further, the former numeral of the subscript relating to the angle of incidence is set to "1" if an inclination of an incident ray of light along a direction from the top right to the bottom left relative to the vertical direction in the drawing is large, "2" if the inclination is small, "3" if there is no inclination since an incident ray is of the vertical direction, "4" if an inclination of an incident ray of light along a direction from the top left to the bottom right relative to the vertical direction is small, and "5" if the inclination is large. Those settings are made for the sake of convenience in description.

Further, it is hard to recognize the cells if they are displayed while being overlapped in the drawing, and hence the cells are displayed by being separated from each other in a sensor plane. In other words, it appears in the figure that the rays of light converge in a portion slightly spaced apart from the sensor plane (the focus position is shifted upward in FIG. 1), which is also for the sake of convenience in order to clarify the description.

As described above, the description with reference to FIG. 1 is directed to the one dimensional array of the cells for the sake of brevity, but the array may be easily expanded so as to correspond to a two dimensional image. In addition, the number of angular divisions to be obtained is illustrated as five, but may be appropriately set by the user according to an application that uses the light field information. Specifically, the imaging apparatus 201 may present use purposes to him/her as examples, and then set the number of angular divisions according to the use purpose. For example, the number of angular divisions may be set large for a refocus purpose or small for obtaining a 3D image.

In FIG. 1, dotted lines extending in the vertical direction and diagonal directions schematically indicate the rays of light.

An LFC proposed in recent years, some optical elements are placed along a photographing optical path in order to separately obtain $X_{1,i}$, $X_{2,i}$, $X_{3,i}$, $X_{4,i}$, and $X_{5,i}$. On the other hand, in this embodiment, the optical elements are not placed, and hence the information relating to the angle of incidence can be observed only in an integrated state. Note that, in FIG. 1, an image signal is represented as sum of each pixel signal since the angle of incidence is made discrete.

Consideration is given to a case where the focus is adjusted by the lens system control unit 212 as shown as the sensor plane 2 to perform the photographing. At this time, assuming that a luminance of the pixel i in the sensor plane 2 is $I_i$, the following expression is obtained.

$$I_i = \sum_{j=1}^{5} X_{j,i} \tag{1}$$

A pixel signal I is given by adding electric signals X from the respective cells within the pixel. In addition, with the entire image taken into consideration, the pixel signals I can be expressed as follows.

$$\begin{pmatrix} \vdots \\ I_{i-1} \\ I_i \\ I_{i+1} \\ \vdots \end{pmatrix} = \begin{pmatrix} \ddots & \vdots & \vdots & \vdots & \vdots & \vdots & \vdots & \vdots & \vdots & \vdots & \vdots & \vdots & \vdots & \vdots & \vdots \\ \ldots & 1 & 1 & 1 & 1 & 1 & 0 & 0 & 0 & 0 & 0 & 0 & 0 & 0 & 0 & \ldots \\ \ldots & 0 & 0 & 0 & 0 & 0 & 1 & 1 & 1 & 1 & 1 & 0 & 0 & 0 & 0 & \ldots \\ \ldots & 0 & 0 & 0 & 0 & 0 & 0 & 0 & 0 & 0 & 0 & 1 & 1 & 1 & 1 & 1 \ldots \\ \vdots & \vdots & \vdots & \vdots & \vdots & \vdots & \vdots & \vdots & \vdots & \vdots & \vdots & \vdots & \vdots & \vdots & \vdots & \ddots \end{pmatrix} \begin{pmatrix} \vdots \\ X_{1,i-1} \\ X_{2,i-1} \\ X_{3,i-1} \\ X_{4,i-1} \\ X_{5,i-1} \\ X_{1,i} \\ X_{2,i} \\ X_{3,i} \\ X_{4,i} \\ X_{5,i} \\ X_{1,i+1} \\ X_{2,i+1} \\ X_{3,i+1} \\ X_{4,i+1} \\ X_{5,i+1} \\ \vdots \end{pmatrix} \tag{2}$$

Here, consideration is given to a case where the focus state is changed to perform photographing. In particular, consideration is given to a case where the photographing is performed with the focus changed to a position indicated by the sensor plane 1 in FIG. 1. In FIG. 1, the cells corresponding to the rays of light obtained by the pixel i in an actual sensor plane are indicated by the gray shaded areas. In other words, in a case where the sensor plane 1 is focused on, the ray of light corresponding to the cell $X_{1,i+2}$ is incident on the cell $X_{1,i}$, the ray of light corresponding to the cell $X_{2,i+1}$ is incident on the cell $X_{2,i}$, and the ray of light corresponding to the cell $X_{3,i}$, is incident on the cell $X_{3,i}$. Further, the ray of light corresponding to the cell $X_{4,i-1}$ is incident on the cell $X_{4,i}$, and the ray of light corresponding to the cell $X_{5,i-2}$ is incident on the cell $X_{5,i}$.

To express this in the same forms as Expression 1 and Expression 2, Expression 3 and Expression 4 are obtained.

$$I\ i = \sum_{j=1}^{5} X_{j,i+3-j} \tag{3}$$

$$\begin{pmatrix} \vdots \\ I_{i-1} \\ I_i \\ I_{i+1} \\ \vdots \end{pmatrix} = \begin{pmatrix} \ddots & \vdots & \vdots & \vdots & \vdots & \vdots & \vdots & \vdots & \vdots & \vdots & \vdots & \vdots & \vdots & \vdots & \vdots \\ \cdots & 0 & 0 & 1 & 0 & 0 & 0 & 1 & 0 & 0 & 0 & 1 & 0 & 0 & 0 & \cdots \\ \cdots & 0 & 0 & 0 & 1 & 0 & 0 & 0 & 1 & 0 & 0 & 0 & 1 & 0 & 0 & \cdots \\ \cdots & 0 & 0 & 0 & 0 & 1 & 0 & 0 & 0 & 1 & 0 & 0 & 0 & 1 & 0 & 0 & \cdots \\ \vdots & \vdots & \vdots & \vdots & \vdots & \vdots & \vdots & \vdots & \vdots & \vdots & \vdots & \vdots & \vdots & \vdots & \ddots \end{pmatrix} \begin{pmatrix} X_{1,i-1} \\ X_{2,i-1} \\ X_{3,i-1} \\ X_{4,i-1} \\ X_{5,i-1} \\ X_{1,i} \\ X_{2,i} \\ X_{3,i} \\ X_{4,i} \\ X_{5,i} \\ X_{1,i+1} \\ X_{2,i+1} \\ X_{3,i+1} \\ X_{4,i+1} \\ X_{5,i+1} \\ \vdots \end{pmatrix} \tag{4}$$

Here, correspondence relationships and expressions that represent the correspondence relationships are specifically described with regard to the sensor plane 1, but it is clear that the same correspondence and the same mathematical expressions can also be effected with regard to the sensor plane 3.

Now, it is assumed that Expression 2 and Expression 4 are written simply as Expression 5.

$$I_p = M_p x \tag{5}$$

Here, $I_p$ represents a luminance signal obtained from the image pickup plane, and a subscript p thereof corresponds to the focus state. $I_p$ can be obtained by reading the information from the image pickup element 206. $M_p$ represents a matrix indicating the focus state, and the subscript p corresponds to the focus state in the same manner as in $I_p$. $M_p$ is found when the focus position is determined, and can be known based on the position in which the focus lens is stopped by using the lens drive unit 213 and the information from the distance measurement unit 215. X represents a vector indicating the light field information, which is irrelevant to the focus state. X is unknown, which needs to be found.

A process for obtaining the light field information is a process for finding X in Expression 5, but an inverse matrix of $M_p$ does not exist as apparent from Expression 2 and Expression 4, and hence the expression cannot be solved as it is (The solution is indefinite because information larger in amount than original information is to be extracted).

Therefore, in the imaging apparatus according to this embodiment, consideration is given to a case where a plurality of images are obtained while changing the focus state, to find X in Expression 5.

When the images are obtained while changing the focus state as p1, p2, . . . , and pn (which corresponds to the focus bracket photographing because the images are obtained while changing the focus state), Expression 5 is established for each focus state, and those expressions are combined. In other words, those expressions are processed as in Expression 6.

$$\begin{pmatrix} I_{p1} \\ I_{p2} \\ \vdots \\ I_{pn} \end{pmatrix} = \begin{pmatrix} M_{p1} \\ M_{p2} \\ \vdots \\ M_{pn} \end{pmatrix} X \tag{6}$$

In addition, to simplify the representation, Expression 6 is rewritten as Expression 7.

$$I = MX \tag{7}$$

If Expression 7 is established by obtaining the images in the focus state of the same number of angular divisions as the above-mentioned number of angular divisions (described as five in FIG. 1), M is a square matrix. If an inverse matrix of M exists, X can be found by Expression 8.

$$X = M^{-1} I \tag{8}$$

In this expression, $M^{-1}$ represents the inverse matrix of M.

A value of a determinant of M in Expression 8 varies based on what kind of focus state the plurality of images are obtained in. If the value of the determinant is closer to zero, noise is amplified, and the obtained solution is subject to influence of the noise, which allows more redundant images to be obtained.

If Expression 7 is established by obtaining the images of larger number of angular divisions than the above-mentioned number of angular divisions (described as five in FIG. 1), M is a vertical matrix. In this case, the information is redundant, and hence X can be found by a appropriate method. Here, a method of finding X by using a quasi inverse matrix for obtaining a resolution which is of the at least squares method is specifically represented by Expression 9.

$$X = (M^t M)^{-1} I \tag{9}$$

Here, $M^t$ represents a transposed matrix of M.

In this manner, the light field information can be obtained by obtaining the images of equal to or larger than the number of angular divisions to be obtained and performing a suitable inverse convolution operation.

Correspondences between the mathematical expressions described above and FIGS. 3A and 3B are described in brief. The photographing is performed in the focus state as represented by Expression 5 and Expression 6, and the processing operation step of determining the focus state corresponds to Step S302. The processing operation step of obtaining a plurality of images $I_{p1}, I_{p2}, \ldots,$ and $I_{pn}$ corresponds to the focus bracket photographing performed in Step S303 to Step S306. The processing operation step of obtaining the inverse matrix $M^{-1}$ and the quasi inverse matrix $(M^tM)^{-1}$ of Expression 8 and Expression 9 correspond to Step S312. The processing operation step of solving Expression 8 and Expression 9 to find X from 1 formed of a plurality of images correspond to Step S313.

Further, a bracket width used to perform the focus bracket photographing has a desired value. Referring to luminance information as much as possible when determining one ray of light achieves such a desired result that the solution is highly resistant to the noise. In order to achieve this, the states of $M_p$ indicated by Expression 2 and Expression 4 are important. In other words, it correspondingly suffices that the forms of Expression 6 and Expression 7 are employed to increase the number of portions that are not zero when components of the matrix M are observed in the vertical direction. In contrast, if a focus bracket width is too large, the light field information is obtained only sparsely, which brings Expression 8 and Expression 9 to a state in which an inverse matrix does not exist.

In addition, the focus bracket width is specifically described with reference to FIG. 1. The element M, that is not zero may be increased as described above, but to this end, the plurality of images are obtained while inhibiting the rays of light from shifting from the sensor planes illustrated in FIG. 1 by an amount larger than one pixel. This is determined based on the number of angular divisions N to be obtained, an F number $F_{no}$ at a time of the photographing, a pixel pitch $\Delta X$, and the like. Specifically, assuming that the focus bracket width is $\Delta Z$, the following condition may be set.

$$\Delta Z \leq N \cdot F_{no} \cdot \Delta X \qquad (10)$$

(The bracket width is suitably set in Step S302 so as to satisfy this condition.)

By finding X as described above, a luminance value of the pixel outside the focus position of the focus bracket photographing can be obtained by calculating product of X and M corresponding to the position.

This embodiment is directed to the description of the imaging apparatus for recording the light field information by performing the focus bracket photographing. However, the imaging apparatus may perform the process up to the focus bracket photographing and the recording of the photographing condition, while an information processing device may be provided with the light ray determination unit to convert the image pickup data into the light field information. In this case, the imaging apparatus is not necessarily provided with a large memory space or a large-scale processing device, and it is possible to simplify the imaging apparatus.

As described above, according to the embodiment of the present invention, it is possible to provide a camera capable of the same photographing as performed by the related-art camera and the photographing for obtaining the light field information without the need of providing a special optical system or a special drive.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-022436, filed Feb. 7, 2013, which is hereby incorporated by reference herein in its entirety.

What is claimed is:

1. An imaging apparatus, comprising:
   an image pickup element including a two-dimensional array of a plurality of photoelectric conversion elements, configured to output an electric signal of an optical image of an object;
   a focus adjustment unit configured to adjust a focus state of a photographing optical system for forming the optical image of the object;
   an image pickup control unit configured to obtain an electric signal from the image pickup element in a plurality of different focus states necessary for obtaining light field information of the optical image of the object while changing the focus state by the focus adjustment unit; and
   a light ray determination unit configured to obtain incident position information and incident angle information, which are the light field information of the optical image of the object, by using the electric signals in the plurality of different focus states obtained by the image pickup control unit,
   wherein the light ray determination unit determines a resolving power of the incident angle information, calculates the incident position information based on the resolving power of the incident angle information, and generates a matrix for calculating the incident angle information by inverse convolution from the calculated incident position information.

2. An imaging apparatus according to claim 1, wherein:
   the image pickup control unit makes a number of a plurality of different focus states larger than a value which indicates the resolving power of the incident angle information; and
   the light ray determination unit generates the matrix corresponding to each of the plurality of different focus states.

3. An imaging apparatus according to claim 1, wherein the light ray determination unit controls a change width of the focus state in order to satisfy the following condition:

$$\Delta Z \leq N \cdot F_{no} \cdot \Delta X$$

where N denotes the resolving power of the incident angle information, $F_{no}$ denotes an F number of the photographing optical system, $\Delta X$ denotes a pixel pitch of the image pickup element, and $\Delta Z$ denotes a focus bracket width (focus width on each focus bracket photographing).

4. An imaging apparatus according to claim 1, wherein the light ray determination unit determines the resolving power of the incident angle information, depending on a use purpose of the light field information, the use purpose of the light field information including at least obtaining of refocus and 3D images.

5. An imaging apparatus according to claim 1, further comprising a unit configured to select a photographing mode in which the image pickup control unit controls the focus adjustment unit and the image pickup element so as to pick up the optical image of the object in an in-focus state thereof and the light ray determination unit is inhibited from obtaining the light field information.

6. An imaging apparatus according to claim 1, further comprising a recording unit configured to record the incident position information and the incident angle information, which are obtained by the light ray determination unit, in a recording medium.

7. An information processing device, comprising:
   an obtaining unit configured to obtain electric signals obtained from an image pickup element in a plurality of different focus states necessary for obtaining light field information of an optical image of an object while changing a focus state of the optical image of the object by a focus adjustment unit; and
   a light ray determination unit configured to obtain incident position information and incident angle information, which are the light field information of the optical image of the object, by using the electric signals in the plurality of different focus states,
   wherein the light ray determination unit determines a resolving power of the incident angle information, calculates the incident position information based on the resolving power of the incident angle information, and generates a matrix for calculating the incident angle information by inverse convolution from the calculated incident position information.

8. An information processing device according to claim 7, wherein a number of the plurality of different focus states is made larger than a value which indicates the resolving power of the incident angle information, and wherein the light ray determination unit generates the matrix corresponding to each of the plurality of different focus states.

9. An information processing device according to claim 7, wherein the light ray determination unit determines the resolving power of the incident angle information, depending on a use purpose of the light field information, the use purpose of the light field information including at least obtaining of refocus and 3D images.

10. An information processing device according to claim 7, further comprising a recording unit configured to record the incident position information and the incident angle information, which are obtained by the light ray determination unit, in a recording medium.

11. An image pickup method, which is performed by using a photographing optical system configured to form an optical image of an object and an image pickup element, which includes a two-dimensional array of a plurality of photoelectric conversion elements, configured to output an electric signal of the optical image, the image pickup method comprising:
   a focus adjustment step of adjusting a focus state of the photographing optical system;
   an image pickup control step of obtaining electric signals from the image pickup element in a plurality of different focus states necessary for obtaining light field information of the optical image of the object while changing the focus state in the focus adjustment step; and
   a light ray determination step of obtaining incident position information and incident angle information, which are the light field information of the optical image of the object, by using the electric signals obtained in the plurality of different focus states in the image pickup control step,
   wherein the light ray determination step includes:
      determining a resolving power of the incident angle information;
      calculating the incident position information based on the resolving power of the incident angle information; and
      generating a matrix for calculating the incident angle information by inverse convolution from the calculated incident position information.

12. A non-transitory computer-readable storage medium storing a program for controlling an imaging apparatus, the imaging apparatus comprising:
   a photographing optical system configured to form an optical image of an object; and
   an image pickup element including a two-dimensional array of a plurality of photoelectric conversion elements, configured to output an electric signal of the optical image,
   wherein the program comprises a code for causing a computer to function as:
      a focus adjustment unit configured to adjust a focus state of the photographing optical system;
      an image pickup control unit configured to obtain electric signals from the image pickup element in a plurality of different focus states necessary for obtaining light field information of the optical image of the object while changing the focus state by the focus adjustment unit; and
      a light ray determination unit configured to obtain incident position information and incident angle information, which are the light field information of the optical image of the object, by using the electric signals obtained by the plurality of different focus states the image pickup control unit,
   wherein the light ray determination unit determines a resolving power of the incident angle information, calculates the incident position information based on the resolving power of the incident angle information, and generates a matrix for calculating the incident angle information by inverse convolution from the calculated incident position information.

* * * * *